Aug. 8, 1933.  L. P. HUTT  1,921,126
COMBINED AUTOMATIC AND MANUAL CIRCUIT CONTROLLER
Filed Dec. 5, 1929
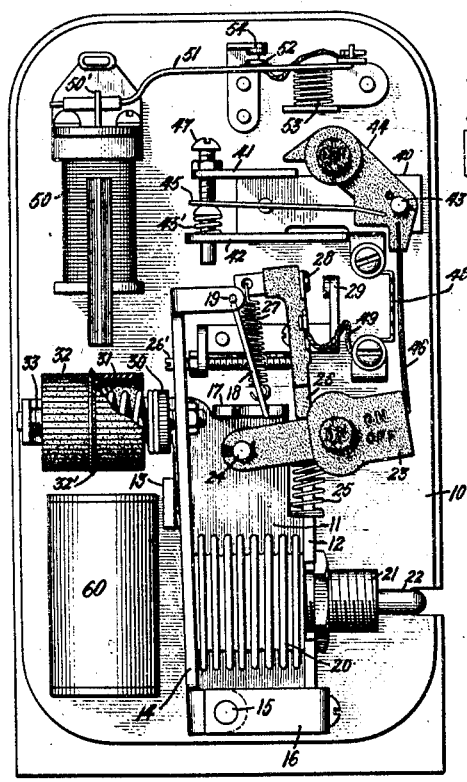
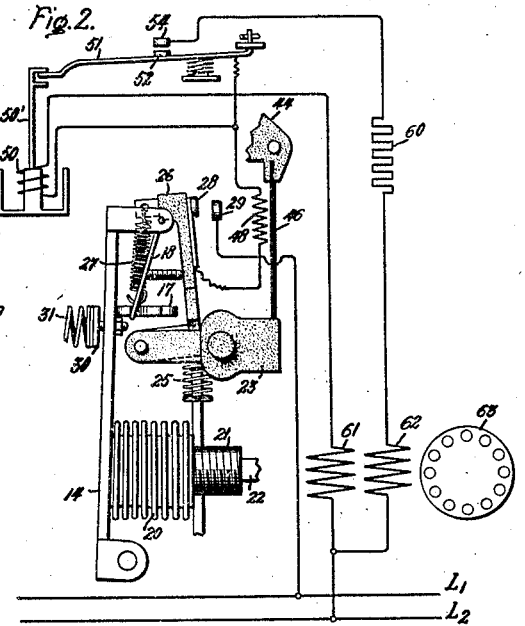
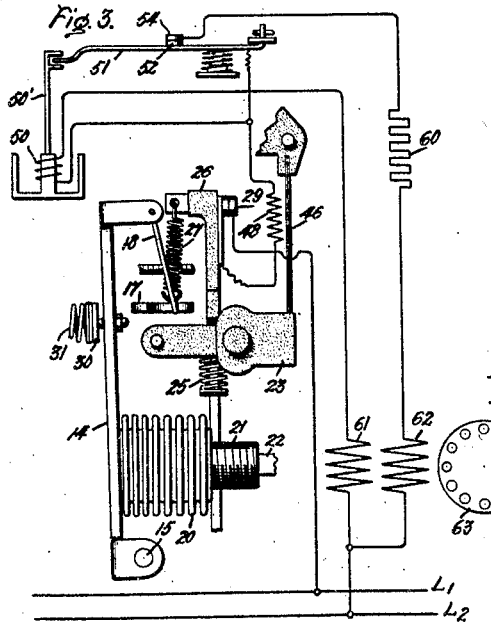
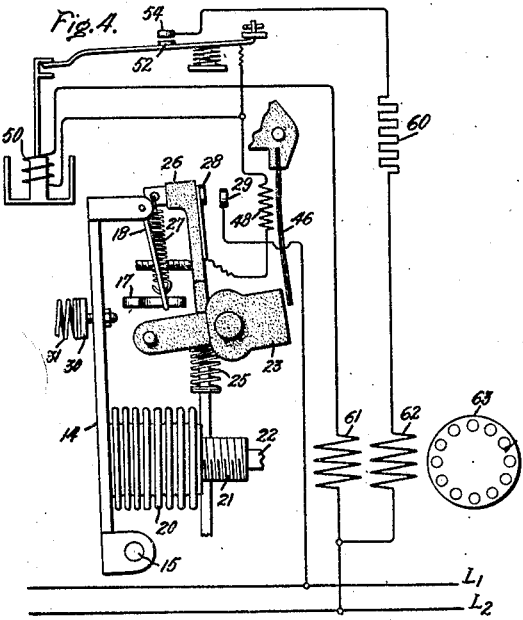
Inventor:
Leonard P. Hutt,
by Charles V. Tullo
His Attorney.

Patented Aug. 8, 1933

1,921,126

UNITED STATES PATENT OFFICE 1,921,126

COMBINED AUTOMATIC AND MANUAL CIRCUIT CONTROLLER

Leonard P. Hutt, Schenectady, N. Y., assignor to General Electric Company, a Corporation of New York Application December 5, 1929. Serial No. 411,961

18 Claims. (Cl. 200—81)

This invention relates to circuit controlling devices, and pertains especially to controllers for electrically operated apparatus such as electric refrigerators or the like where it is desired that the circuit of the device be controlled automatically by means responsive to predetermined conditions, such as temperature, as well as be protected automatically from excessive current flow, and in addition be under manual control for initiating and terminating operation of the device at will. This invention is an improvement of my device as set forth in Patent 1,637,042, issued July 26, 1927.

It is an object of the present invention to provide a controller of the above character capable of accomplishing all of the automatic and manual controlling functions through the agency of the same circuit controlling switch mechanism.

In the useful form of household refrigerator, the refrigeration is accomplished by a compressor driven by an electric motor which is started and stopped through the agency of an automatic device operating in accordance with temperature conditions within the refrigerator. The present invention enables the automatic temperature control of the electric refrigerating device and the overload protection of the device as well as the manual control thereof to be consolidated in a single switch mechanism for opening and closing the energizing circuit of the refrigerating device.

More specifically the automatic switch means of the present invention consists of a circuit closing member actuated by means of a temperature device. This switch mechanism is also controlled by means of manually operated means and by means of an overload device which responds to excessive current through the compressor motor. Means are also provided for raising or lowering the temperature operating limits as well as varying the range between the temperature limits at which the device operates.

Referring to the drawing, Fig. 1 shows an arrangement of the various parts of the switch; Figs. 2, 3 and 4 represent various positions of the switch mechanism.

Referring to Fig. 1, 11 designates a frame mounted upon a base 10 of moulded insulating material. The frame 11 is provided with upturned portions 12, 13 and 17, the portions 13 and 17 serving as mechanical stops for the pivoted members 14 and 18. The member 14 is pivotally mounted at 15 in the frame 11 and a bracket member 16 attached to the upturned portions 12 of the frame. The U-shaped member 18 is pivotally mounted in the member 14 at the point 19.

The numeral 20 designates the well-known type of expansible metal bellows which responds to the variations in pressure of the fluid carried thereby and in the element 21 and the pipe 22 which extends into the refrigerator compartment. A suitable fluid for such action may be, for example, sulphur dioxide. As the fluid contracts or expands due to the temperature changes within the refrigerator, the bellows 20 responds thereto to move the pivoted member 14 about its pivot.

The numeral 23 designates a manually operated device pivoted at 24 and spring urged to the off position by means of a spring 25. The member 23 coacts with the pivoted switch member 26 also mounted at 24 and carrying a contact 28 to lock this member in the open position. A spring member 27 connects the member 26 with the pivoted member 18. This spring member produces a snap action of the pivoted member 26 upon actuation of the member 14 when the member 23 is in the on position to close contacts 28 and 29.

The action of the spring 27 to produce a snap action of the member 26 is somewhat as follows. Referring to Fig. 2, as the element 14 is rotated in a counterclockwise direction, the spring 27 is placed under an increasing tension due to the fact that the lower portion of element 18 to which the spring is attached is moved further from the point of attachment of the spring 27 to the member 26. The member 18 will approach a position parallel to that of the spring. When the member 18 moves to the left of the position parallel to the spring 27, the spring member 27 will tend to move to such a position as to decrease the tension therein. The distance between its ends will be decreased by a movement of the member 18 to its furthest right hand position permitted by the stop member 17. This will result in a quick movement of the member 18 about its pivot and simultaneously therewith a movement of the member 26 about its pivot in a clockwise direction to close the contacts 28 and 29 with a snap action. The opening movement of these contacts is produced in the same manner by a movement of the member 14 in a clockwise direction upon a contraction of the bellows 20.

A cap member 30 is threadedly mounted in the member 14 and coacts with a spring member 31 carried within the cylinder 32. The cylinder 32 provided with a ridge 32' for indicating adjustment is mounted upon a screw member 33 which permits adjustment of the compression of the spring 31 when the cylinder 32 is moved to the right or left upon the screw member 33. This raises or lowers the temperature limits at which the member 14 operates by exerting a greater or less pressure upon the pivoted member 14 to oppose the pressure exerted by the expansible bellows 20.

It will be apparent that if the spring 31 is tensioned by being initially compressed, a greater force in the bellows 20 is necessary to produce movement of the pivoted member 14 in a counter-clockwise direction to close the contact 28. This means that a higher temperature must be reached within the refrigerator before a sufficient pressure will be established in the bellows 20 to actuate the pivoted member 14. In a like manner the pivoted member 14 will move in a clockwise direction to open the contact 28 at a higher temperature. Thus both the opening and closing temperatures will be raised. An opposite effect will be produced when the tension in the spring 31 is decreased; that is, a lower temperature for opening and closing the contact 28 will result.

A second adjusting means 26' in the form of a screw member abutts the pivoted member 26. Adjustment of the screw member 26' to the left permits the point of attachment of the spring 27 to the pivoted member 26 to be moved to the left also. This means that before the pivoted member 26 is rotated in a clockwise direction by the action of member 14, the member 14 must move further to the left to pass the point at which the spring member 27 is attached to the member 26. Since this action depends upon the expansion of the bellows 20, it will be necessary for the bellows 20 to expand to a greater extent than before the screw member had been moved to the left. This results from a higher temperature. The lower temperature limit is not affected by the screw member 26'. It will thus be seen that the range between the opening and closing temperatures is increased by a movement of the screw member 26' to the left. Conversely the adjustment of the screw 26' to the right decreases the range between the opening and closing temperatures.

Attached to the contact 28 upon the pivoted member 26 by means of a flexible conductor 49 is the heating resistor 48 of the overload device which upon heating due to overload conditions affects the bimetallic thermostat strip 46 adjacent thereto, said bimetallic strip 46 being mounted in a moulded manually operated pivoted member 44. This pivoted member 44 is mounted upon a member 43 attached to the frame 40, provided with upturned parts 41 and 42. Threadedly mounted in the portion 41 is a screw member 47 for adjusting the position of the spring member 45 which is spring pressed by the element 45'. Adjustment of the screw 47 determines the position of the bimetallic strip 46 with respect to the heating element 48. This determines the degree of overloading of the motor necessary to actuate the bimetallic strip 46 to permit the member 23 to be released to actuate the member 26. An electro-responsive device 50, provided with a plunger 50', is mounted on the base 10. Upon actuation of said member the plunger 50' releases the pivoted member 51 which is spring urged in an upward direction by means of springs 53 to close the contact 52 carried upon the member 51 upon the contact 54 to complete a circuit to be described later. 60 is a starting resistor. The electro-responsive device 50 which actuates the starting switch 51 provided with the contacts 52 and 54 and the starting resistor 60 are not in any way essential to the operation of the control mechanism included upon the base 10.

Referring to Fig. 2 of the drawing, $L_1$ and $L_2$ designate the power lines from which energy is supplied to the alternating current motor 63 provided with windings 61 and 62. 61 designates the running winding and 62 the starting winding.

The operation of the device is as follows. Referring to Fig. 2, when the bellows 20 expands due to an increase in temperature in the refrigerator, the member 14 is pivoted in a counter-clockwise direction causing the member 26 to rotate to the right to close the contacts 28 and 29 with a snap action. This completes a circuit from the line $L_2$ through the winding 61, the electro-responsive device 50, the overload heating element 48, contacts 28 and 29 to the other side of the line $L_1$. With the motor at standstill the large inrush of current through the winding of the electro-responsive device 50 actuates the electro-responsive device 50 to close the contacts 52 and 54, thereby completing a circuit through the resistor 60 and the starting winding 62. This causes the alternating current motor to start and when the motor reaches normal speed decreased excitation of the electro-responsive device 50 due to the building up of the back E. M. F. in the motor permits the plunger 50' to return to its normal position, opening up the contacts 52 and 54 taking out of the circuit the starting winding 62.

Fig. 3 represents the position of the various parts of the device upon acceleration of the motor upon starting.

If the motor 63 becomes overloaded and there is an increase in the current flow above normal through the resistor 48, the heat dissipated by this element causes the bimetallic strip to assume the position shown in Fig. 4. When the element 46 rides off the manually operated member 23, the spring 25 will urge this member in a counter-clockwise direction resulting in pivoting the member 26 in the same direction to open the contacts 28 and 29 and thereby interrupting the circuit through the motor. The parts remain locked in this position until the member 23 is again manually operated to the on position, after the bimetallic strip has assumed its normal condition. The member 23 will not remain in the on position until the bimetallic strip 46 has returned to its normal condition. The apparatus may be rendered inoperative by manual operation of the member 44 which causes strip 46 to release member 23. In this manner the apparatus may be placed in operative or in inoperative condition.

It will thus be apparent that my invention makes it possible to consolidate the controlling functions of a plurality of automatically operated devices and a manually operated device, all in a single circuit controlling switch mechanism so that each device is able to effect the opening of the circuit independently of the other devices. In this way the invention presents a compact and reliable circuit controller that is of particular advantage in controlling electric refrigeration or in other similar service. While I have illustrated and described only one form of my switch mechanism embodying the invention, it will be understood that the invention also may be embodied in other forms.

What I claim as new and desire to secure by Letters Patent of the United States is:

1. In a circuit controlling device, the combination of a stationary contact and a movable contact movable into and out of engagement therewith, at least three separate operating means for said movable contact, and connections between each operating means and the movable contact for effecting movement of said movable contact out of engagement with said stationary contact, the connections of at least a plurality of said operating means being arranged to permit the said operating means to effect movement of the movable contact into engagement with said stationary contact.

2. In a circuit control device, a stationary contact, a movable member carrying a contact cooperating therewith, a temperature responsive means for actuating said movable member, a member manually operative for controlling the operation of said movable member and a means manually and thermostatically operable for controlling said first manually operated member to open said contacts and render said movable member inoperative in the open position.

3. In a circuit control device, a stationary contact, a pivoted member carrying a contact cooperating therewith, a second pivoted member mounted upon the same pivot for locking said first member in an open position and a third pivoted member manually and thermostatically operable to control said second pivoted member to open the contacts and lock said first pivoted member in an open position after said second pivoted member has been manually operated to permit closing of said contacts.

4. In a circuit control device, a stationary contact, a movable switch member carrying a contact cooperating therewith, temperature responsive means yieldingly connected with the switch member for operating the same each way between two positions, a member biased to operate the switch member from one of said positions to the other independently of the temperature responsive actuating means, means for holding said member against its bias, manual means for releasing said holding means, and thermal current responsive means for releasing said holding means.

5. A circuit controlling device comprising a movable member, a circuit controlling member disposed in opposing spaced relation with said movable member and movable to a plurality of circuit controlling positions, operating connections between said members including a member pivoted at one end to said movable member, and a spring connecting the other end of said pivoted member to the circuit controlling member to move said circuit controlling member when said movable member is actuated to predetermined critical positions, stops spaced apart and positioned between said movable member and said circuit closing member and between which the spring end of said pivoted member moves, so that when said movable member moves to one critical position to move said circuit controlling member to one circuit controlling position the pivoted member will engage one stop and when the movable member moves to another critical position to move the circuit controlling member to another circuit controlling position the pivoted member will engage the other stop.

6. A circuit controlling device comprising a movable member, a circuit controlling member movable to a plurality of circuit controlling positions, a U-shaped member pivoted at its open end to said movable member, and a spring connecting the other end of said pivoted member to the circuit controlling member to move said circuit controlling member when said movable member is actuated, said spring and circuit controlling member being movable between the legs of said pivoted member, stops between which the spring end of said pivoted member moves so that when said movable member moves to one position to move said circuit controlling member to one circuit controlling position the pivoted member will engage one stop and when the movable member moves to another position to move the circuit controlling member to another circuit controlling position the pivoted member will engage the other stop.

7. In a circuit controlling device, a member provided with upturned extensions upon which said member is pivoted and providing a pivoting means for a second member, a temperature responsive device for actuating said member, a U-shaped member pivotally supported in extensions of said first pivoted member, a second U-shaped pivoted member carrying a circuit closing contact oppositely disposed to said first member and a spring positioned between said first member and said contact carrying member and resiliently connecting said first U-shaped member between the arms of which it is positioned and said contact carrying member, said spring causing a snap action of said contact carrying member upon movement of said first member, all of the pivots of the above members being in a substantially straight line.

8. In a circuit controlling device, automatic circuit controlling means responsive to predetermined conditions including an over center snap action element, said element having two critical operating positions, an adjustable means for controlling said automatic means to respond to different predetermined conditions without affecting the critical operating positions and a second adjusting means for varying one of said critical positions of said over center element to vary the range between the predetermined conditions.

9. In a circuit controlling device, automatic means responsive to certain predetermined conditions having a plurality of movable members including a circuit controlling member movable to different circuit controlling positions, an over center snap action element having a lost motion connection between the said movable members, said over center element having two critical positions, an adjusting means controlling said automatic means to respond to different predetermined conditions without affecting said critical positions and a second adjusting means for varying one of said critical positions of said over center element to vary the range between the predetermined conditions.

10. In a circuit control device, a plurality of movable members, one of said members operated by a heat responsive unit and the second operated by the action of the first, said second member carrying a circuit making contact, an adjustable spring member engaging said first member for raising or lowering the temperature limits of operation of said first member, and an adjustable stop coacting with said second member to vary the temperature range between said temperature limits.

11. In a circuit controlling device, a movable member, a temperature responsive device on one side of said member for actuating the same, a switch mechanism directly above and adjacent said temperature responsive device and resiliently connected to said movable member to produce a snap action of said switch member and an adjustable spring member oppositely disposed to said heat responsive device on the other side of and engaging said movable member for determining the temperature limits at which said member is operated.

12. In a circuit controlling device, a circuit controlling means, a heat responsive device for actuating said means, a resilient member biased to move said circuit controlling means to one position and a spring member oppositely disposed to said heat responsive device, said spring member engaging said circuit controlling means and biased to move said circuit controlling means to another position and enclosed within a cylinder, said cylinder being mounted upon rotation thereof to vary the compression in said spring member to vary the temperatures at which said circuit controlling means operates.

13. In a circuit controlling device for an electric refrigerator, a frame provided with stops, a member pivoted in said frame and movable between said stops, a heat responsive means for actuating said pivoted member, an adjustable compression spring oppositely disposed to said heat responsive device and engaging said pivoted member for determining the temperature limits of operation of said pivoted member, a second pivoted member carrying a circuit making contact thereon, a third pivoted member pivoted in said first pivoted member and connected to said second pivoted member by means of a spring to produce a snap action of said second pivoted member to open and close said contact.

14. In a circuit controlling device for an electric refrigerator, a plurality of interconnected pivoted members, one of said members carrying a contact and connected to another of said members by means of a coil spring to produce a snap action of said contact, a manually operated means spring urged for locking said contact carrying member in an open position, and a second means manually and thermostatically controlled for controlling said first means to operate said contact carrying member to an open position.

15. In a circuit controlling device for an electric refrigerator, a frame provided with stops, a member pivoted in said frame movable between said stops, a heat responsive means for actuating said pivoted member, an adjustably tensioned spring oppositely disposed to said heat responsive device and engaging said pivoted member for determining the temperature limits of operation of said pivoted member, a second pivoted member carrying a circuit making contact thereon, a screw member abutting said contact carrying member for varying the temperature range between the temperature operating limits, a third pivoted member pivoted on said first pivoted member and connected to said second pivoted member by means of a spring to produce a snap action of said second pivoted member to open and close said contact, and a manually operable locking member pivoted beside said contact carrying member for opening and locking said contact member in an open position and another member manually and thermostatically operated controlling said locking member.

16. In a circuit control device for electric refrigerators, a stationary contact, a movable switch member carrying a contact cooperating therewith, temperature responsive means yieldingly connected with the switch member for operating the same with a snap action between two positions, a member biased to operate the switch member from one of said positions to the other position independently of the temperature responsive actuating means, means for holding said member against its bias, manual means for releasing said holding means, and thermal current responsive means for releasing said holding means.

17. An electric refrigerator circuit control device comprising a stationary contact, a movable switch member carrying a contact cooperating therewith, temperature responsive means yieldingly connected with the switch member for operating the same with a snap action between two positions, a member biased to operate the switch member from one of said positions to the other independently of the temperature responsive actuating means, means for holding said member against its bias, manual means for releasing said holding means, thermal current responsive means for releasing said holding means, and manual means for resetting said biased member under the control of said holding means.

18. An electric refrigerator circuit control device comprising a stationary contact, a movable switch member carrying a contact cooperating therewith, means automatically responsive to certain predetermined conditions of the refrigerator, yielding connections between said means and the switch member for operating the same between two positions, a member biased to operate the switch member from one of said positions to the other independently of said automatic means, means for holding said member against its bias, manual means for releasing said holding means, thermal current responsive means for releasing said holding means, and manual means for resetting said biased member under the control of said holding means.

LEONARD P. HUTT.